United States Patent
Burns et al.

(10) Patent No.: US 9,792,336 B1
(45) Date of Patent: *Oct. 17, 2017

(54) GENERATING REAL-TIME SEARCH RESULTS

(71) Applicant: Google Inc., Mountain View, CA (US)

(72) Inventors: Brendan D. Burns, Seattle, WA (US); Lorenz Huelsbergen, Califon, NJ (US); Jeremy Hylton, Easton, PA (US); Laramie Leavitt, Kirkland, WA (US); Addy Ngan, Sunnyvale, CA (US); Jack W. Menzel, Mountain View, CA (US); Kumar Mayur Thakur, West Orange, NJ (US); Vinod Ramachandran Marur, Palo Alto, CA (US); Adam Berenzweig, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/361,575

(22) Filed: Nov. 28, 2016

Related U.S. Application Data

(63) Continuation of application No. 14/719,793, filed on May 22, 2015, now Pat. No. 9,507,826, which is a continuation of application No. 12/960,460, filed on Dec. 3, 2010, now Pat. No. 9,043,319.

(60) Provisional application No. 61/267,433, filed on Dec. 7, 2009.

(51) Int. Cl.
G06F 7/04 (2006.01)
G06F 17/30 (2006.01)

(52) U.S. Cl.
CPC .... *G06F 17/3056* (2013.01); *G06F 17/30554* (2013.01); *G06F 17/30964* (2013.01); *G06F 17/30991* (2013.01); *G06F 17/3053* (2013.01); *G06F 17/3087* (2013.01); *G06F 17/30867* (2013.01)

(58) Field of Classification Search
None
See application file for complete search history.

(56) References Cited

U.S. PATENT DOCUMENTS

| | | | |
|---|---|---|---|
| 6,487,553 B1 * | 11/2002 | Emens | G06F 17/30864 |
| 7,565,358 B2 | 7/2009 | Minogue et al. | |
| 7,606,791 B2 * | 10/2009 | Dettinger | G06F 17/30395 |
| 7,680,838 B1 | 3/2010 | Shaw | |
| 9,311,400 B2 * | 4/2016 | Danninger | G06F 17/30864 |
| 2004/0002961 A1 | 1/2004 | Dettinger | |

(Continued)

OTHER PUBLICATIONS

International Search Report and Written Opinion dated Apr. 29, 2011 for PCT/US2010/058994, filed Dec. 3, 2010, 11 pages.

(Continued)

Primary Examiner — Bruce Moser
(74) Attorney, Agent, or Firm — Fish & Richardson P.C.

(57) ABSTRACT

Methods, systems, and apparatus, including computer programs encoded on a computer storage medium, for generating real-time search results. In one aspect, a method includes receiving a search query from a client; determining that real time search results should be included in a user interface document responsive to the search query; generating the user interface document, including client software to cause the client to present real time search results for the query; and sending the user interface document to the client.

20 Claims, 7 Drawing Sheets

(56) References Cited

U.S. PATENT DOCUMENTS

| | | |
|---|---|---|
| 2004/0243627 A1 | 12/2004 | Jensen et al. |
| 2006/0004702 A1* | 1/2006 | St. John ............ G06F 17/30873 |
| 2007/0078810 A1 | 4/2007 | Hackworth |
| 2008/0065604 A1 | 3/2008 | Tiu et al. |
| 2008/0065701 A1 | 3/2008 | Lindstrom et al. |
| 2008/0071763 A1 | 3/2008 | Ferrenq et al. |
| 2008/0301123 A1 | 12/2008 | Schneider et al. |
| 2008/0306915 A1* | 12/2008 | Wang ................ G06F 17/30525 |
| 2009/0144244 A1 | 6/2009 | Maghoul |
| 2009/0234815 A1 | 9/2009 | Boerries et al. |
| 2010/0169286 A1 | 7/2010 | Hackworth |
| 2010/0257197 A1* | 10/2010 | Hirayama ......... G06F 17/30867 707/769 |
| 2010/0306180 A1 | 12/2010 | Johnson |
| 2011/0270865 A1* | 11/2011 | Ookuma ........... G06F 17/30011 707/769 |
| 2012/0041962 A1* | 2/2012 | Wen .................. G06F 17/30867 707/755 |
| 2012/0143843 A1 | 6/2012 | Smyth et al. |
| 2012/0311139 A1 | 12/2012 | Brave et al. |

OTHER PUBLICATIONS

"Screenshot of Scoopler Revisit", Youtube, XP002633145, [online] [retrieved on Apr. 15, 2011]. Retrieved from the Internet: <URL: http://www.youtube.com/watch?v=Fk3SrYNPd2Q>, 1 page.
Siegler, MG. "Search Goes Real-Time With Scoopler. Twitter Dominates Results." TechCrunch website, May 8, 2009, [online] [Retrieved on May 31, 2011]. Retrieved from the Internet: <URL: http://techcrunch.com/2009/05/08/search-goes-real-time-with-scoopler-twitter-dominates-results/>, 9 pages.

\* cited by examiner

Who are they going to get to report it? Famous Anchor in Accident – cnn.com user123  -  twitter.com  - 1 minute ago

FIG. 6

GENERATING REAL-TIME SEARCH RESULTS

CROSS-REFERENCE TO RELATED APPLICATIONS

This is a continuation of U.S. application Ser. No. 14/719,793, filed May 22, 2015, which is a continuation of U.S. application Ser. No. 12/960,460, filed on Dec. 3, 2010, which claims the benefit of U.S. Provisional Application No. 61/267,433, filed on Dec. 7, 2009. The disclosures of the prior applications are considered part of and are incorporated by reference in the disclosure of this application.

BACKGROUND

This specification relates to generating search results.

Search engines aim to identify resources (e.g., images, audio, video, web pages, text, documents) that are relevant to a user's needs and to present information about the resources in a manner that is most useful to the user. Search engines return a set of search results in response to a user submitted query.

SUMMARY

In general, an innovative aspect of the subject matter described in this specification can be embodied in methods that include the actions of receiving a search query from a client; determining that real-time search results should be included in a user interface document responsive to the search query; generating the user interface document, including client software operable when executed on the client device to present real-time search results for the query; and sending the user interface document to the client. Other embodiments of this aspect include corresponding systems, apparatus, and computer programs recorded on computer storage devices, each configured to perform the operations of the methods.

These and other embodiments can each optionally include one or more of the following features. Determining that real-time search results should be included in a user interface document responsive to the search query includes: receiving data for the search query; generating one or more scores from the data; and determining that each of the scores satisfies a respective threshold for the score. The data includes a rate with which new documents responsive to the query are identified. The data includes one or more counts of common terms shared between resources responsive to the query. The data includes whether the query includes one or more terms that indicate a desire for real-time search results. The data includes trend data on how often the query is submitted by users. The data includes a number of terms in the query. The data includes a measure of how common one or more terms of the query are. The data includes a number of real-time search results responsive to the query. The user interface document further includes non-real-time search results.

In general, another innovative aspect of the subject matter described in this specification can be embodied in methods that include the actions of receiving a re-submitted query and a time token from a client; identifying real-time search results that are responsive to the re-submitted query and are more recent than the time indicated by the time token; and sending the identified real-time search results to the client. Other embodiments of this aspect include corresponding systems, apparatus, and computer programs recorded on computer storage devices, each configured to perform the operations of the methods.

These and other embodiments can each optionally include one or more of the following features. Identifying real-time search results that are responsive to the re-submitted query includes retrieving relevant real-time search results from a search results cache that caches search results responsive to the query. Identifying real-time search results that are more recent than the time indicated by the time token includes comparing the time indicated by the time token to a time associated with each relevant real-time search result. Identifying real time search results that are responsive to the re-submitted query and are more recent than the time indicated by the time token includes filtering duplicate search results.

In general, another innovative aspect of the subject matter described in this specification can be embodied in methods that include the actions of obtaining data for a status update, the data including data indicating a quality of a user who submitted the status update, a quality of the status update itself, and the relevance of the status update to a query; generating a query-specific score for the status update and the query from the obtained data; determining whether the status update is responsive to the query according to the query-specific score; and associating the status update with the query when the status update is determined to be responsive to the query. Other embodiments of this aspect include corresponding systems, apparatus, and computer programs recorded on computer storage devices, each configured to perform the operations of the methods.

These and other embodiments can each optionally include one or more of the following features. Data estimating a quality of a user who submitted the status update is data indicating whether the user is a spammer. When the status update includes a reference, data estimating a quality of the status update is derived from a count of other status updates that include the same reference. Data estimating a quality of the status update is a measure of how well the status update satisfies one or more pre-defined rules that define a high-quality status update. The pre-defined rules include one or more of: good grammar, no strange characters, and no empty hash tags. Determining whether the status update is responsive to the query according to the query-specific score includes comparing the score to a query-specific threshold.

In general, one innovative aspect of the subject matter described in this specification can be embodied in methods that include the actions of identifying a search result that includes a status update comprising text; identifying a reference to a web page in the text of the status update; resolving the reference to the web page; determining a title of the web page; and presenting the search result, including the text of the status update with the reference in the text of the status update replaced with the title of the web page. Other embodiments of this aspect include corresponding systems, apparatus, and computer programs recorded on computer storage devices, each configured to perform the operations of the methods.

These and other embodiments can each optionally include one or more of the following features. The reference can include a Uniform Resource Locator (URL). The actions further include determining a domain of the web page, wherein presenting the search result includes replacing the reference in the text of the status update with the title of the web page and the domain of the web page.

Particular embodiments of the subject matter described in this specification can be implemented so as to realize one or more of the following advantages. Users can be presented with real-time search results. This gives users the most up to date information on their search queries. References, for example, URLs in status updates can be resolved to a title of the page linked to by the reference, providing useful information to a user. Short references, for example, URLs hosted by a URL shortening service such as bit.ly, can be resolved into more meaningful information. A system can filter out content that references undesirable web pages such as web pages identified as malware pages, pornographic pages, or spam pages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 illustrates an example search result where a uniform resource locator (URL) has been resolved.

DETAILED DESCRIPTION

Figure 1:
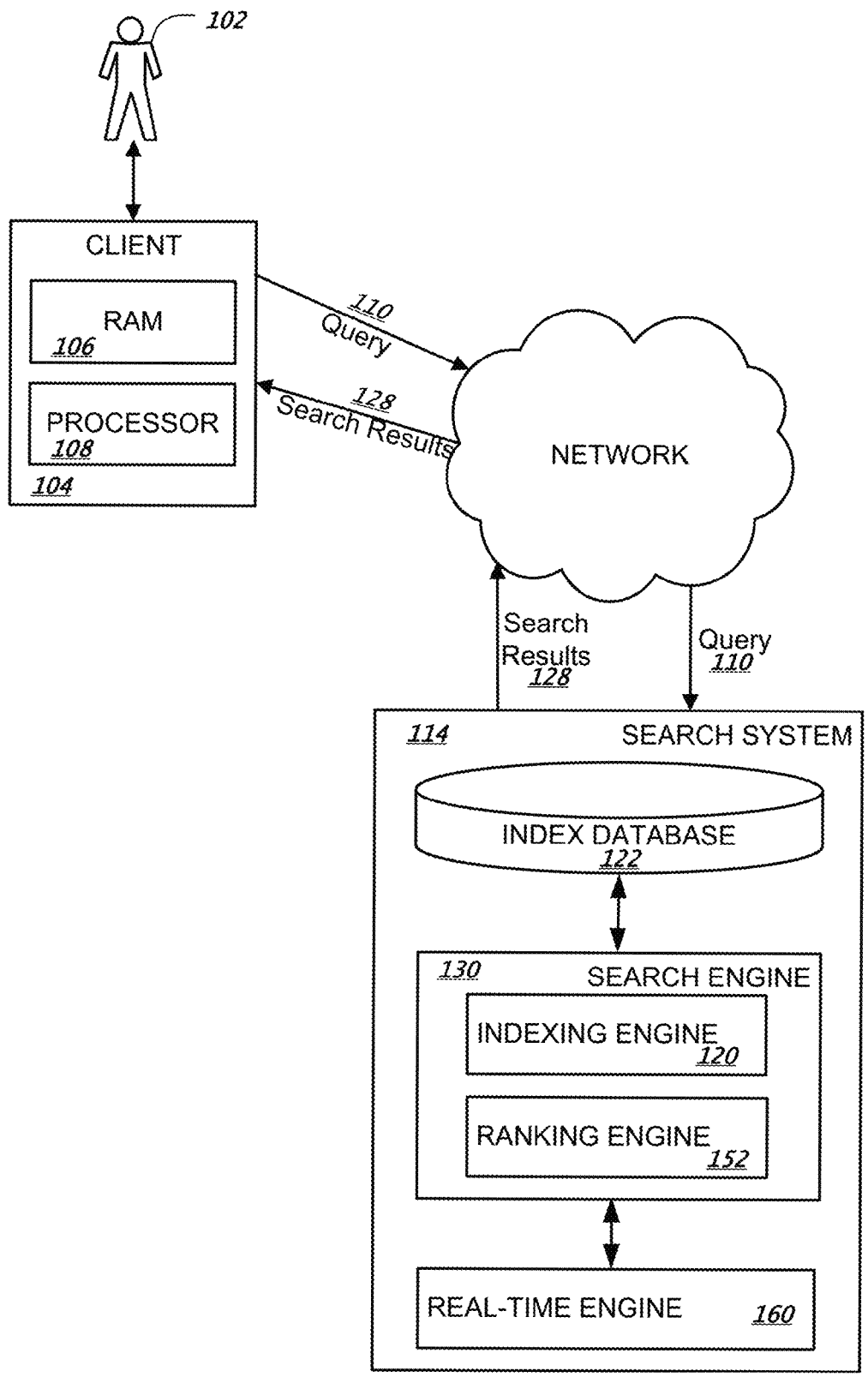
FIG. 1 illustrates an example search system.

FIG. 1 illustrates an example search system 114 for providing search results, e.g., images, documents, videos, or multimedia content relevant to submitted queries as can be implemented in an Internet, an intranet, or other client and server environment. The search system 114 is an example information retrieval system. In some implementations, the search system 114 is specialized to search particular kinds of content. In other implementations, the search system 114 searches content in general.

A user 102 interacts with the search system 114 through a client 104. For example, the client 104 can be or can include a computer (e.g., a personal computer or a mobile phone or programs executing on a computer or other device) coupled to the search system 114 through a wired or wireless local area network (LAN) or wide area network (WAN), e.g., the Internet.

A user 102 submits a query 110 to a search engine 130 within the search system 114. When the user 102 submits a query 110, the query 110 is transmitted through a network to the search system 114. The search system 114 can be implemented as, for example, computer programs running on one or more computers in one or more locations that are coupled to each other through a network. In some implementations, the search system 114 includes an index database 122, a search engine 130, and a real-time engine 160. The index database 122 can be built, for example, using conventional techniques. The search system 114 responds to the query 110 by generating search results 128, which are transmitted through the network to the client 104 in a form that can be presented to the user 102, e.g., as a search results user interface document displayed in a web browser running on the client 104. As described below, the search results 128 can include non-real-time search results and real-time search results. The search engine 130 transmits the search results 128 through the network to the client 104 for presentation to the user 102.

When the query 110 is received by the search engine 130, the search engine 130 determines whether just non-real-time search results, just real-time search results, or a combination of real-time search results and non-real-time search results should be returned to the user. Real-time search results for a query are search results that are both responsive to the query and relatively recent. For example, real-time search results can be search results that were last updated or uploaded within an amount of time that satisfies a threshold. Example resources referenced by real-time search results include, but are not limited to, websites, blogs (e.g., blogs and/or blog posts), status updates (e.g., tweets from a service such as Twitter or updates from a service such as Facebook), news feeds, images, and videos. The resources can be, for example, crawled by a search engine or received from a provider feed. Example provider feeds include news feeds, Really Simple Syndication (RSS) feeds, or feeds from content hosting websites, e.g., Twitter.com. Example criteria for determining whether to return real-time search results to the user are described in more detail below with reference to FIG. 3.

When non-real-time search results are needed, the search engine 130 identifies non-real-time search results that match the query 110 using conventional techniques. For example, the search engine 130 will generally include an indexing engine 120 that indexes content found by the search system 114, such as documents found while crawling the Internet. The search engine 130 also generally includes an index database 122 that stores the index information and a ranking engine 152 or other software to rank the search results that match the query 110, e.g., according to a result score associated with a resource referenced by each result by the engine 130. The result score associated with a resource by the engine 130 can generally be a query-independent measure of the quality of the result, a query-specific measure of how well the result matches the query, or a score derived from both a query-independent measure and a query specific measure. In some implementations, the index database 122 includes multiple indices, for example, corresponding to different types of resources, and the ranking engine 152 uses different scoring functions to score different types of resources.

When real-time search results are needed, the real-time engine 160 identifies relevant real-time search results. The real-time engine 160 provides real-time search results responsive to the query, for example, as described below with reference to FIG. 4. In some implementations, the real-time engine 160 maintains a separate database of potential queries and real-time search results relevant to those queries, as described below with reference to FIG. 2. This database can be used to identify real-time search results.

Figure 2:
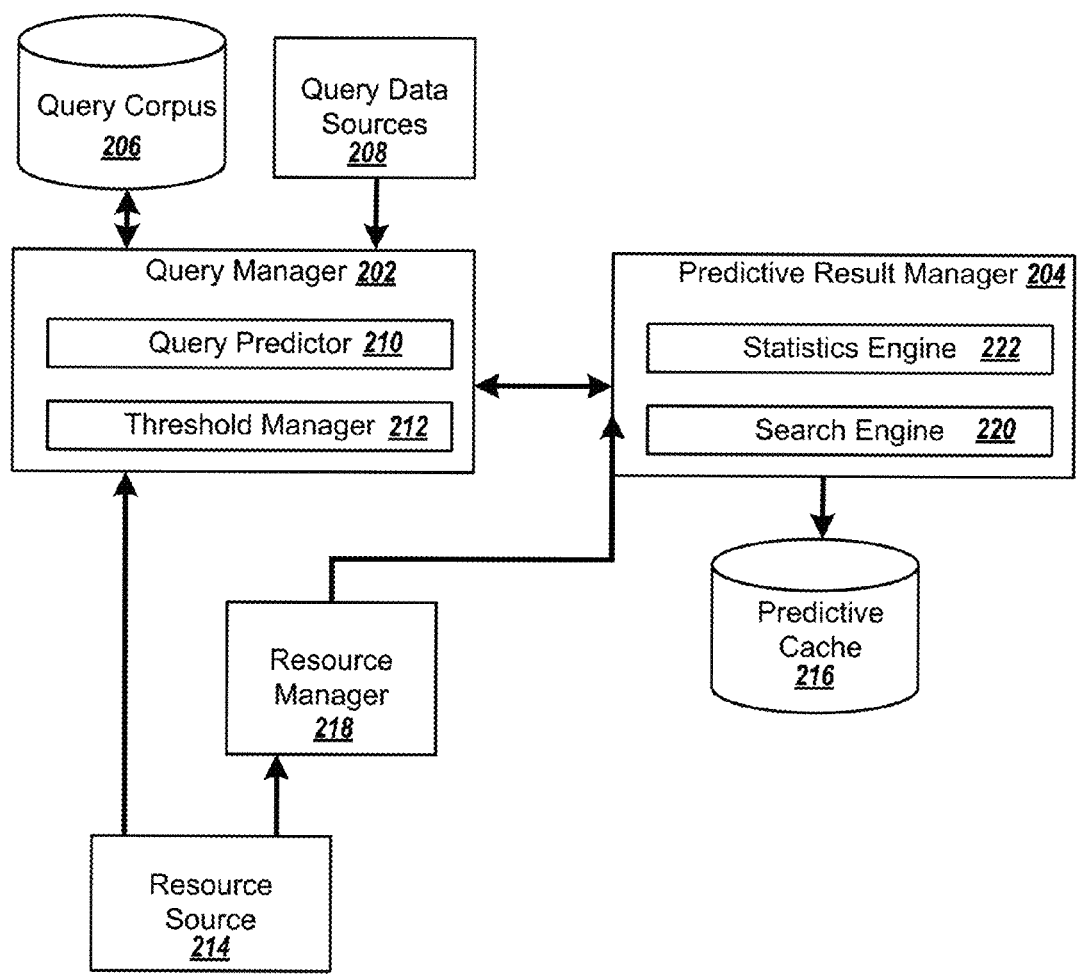
FIG. 2 illustrates an example system for generating a cache of resources responsive to potential queries.

FIG. 2 illustrates an example system 200 for generating a cache of resources responsive to potential queries. The system 200 can be used to predict future queries that users may submit and to pre-identify search results responsive to those queries. These pre-identified search results are then used to build a real-time search results cache that can be used, for example, by the real-time engine 160.

The system includes a query manager 202 that identifies and manages potential queries and a predictive result manager 204 that identifies resources responsive to the potential queries.

The query manager 202 manages potential queries stored in a query corpus 206. The potential queries are queries that the query manager 202 identifies as queries likely to be submitted by users and likely to have responsive real-time search results.

The query manager 202 includes a query predictor 210 and a threshold manager 212. The query predictor 210 identifies new possible queries to add to the query corpus. While the query predictor 210 is illustrated as being included in the query manager 202, in some implementations the query predictor 210 is separate from the query manager 202 and provides potential queries to the query manager 202. The query predictor 210 can identify potential queries from one or more query data sources 208 and resource sources 214, such as query logs, query trend data, news articles, web documents, and status updates.

A query log includes a list of queries received from users. In some implementations, the query log is a list of queries for which users explicitly requested real-time search results. For example, the query log can be a list of queries for which only real-time search results are presented to a user. Alternatively, the query log can include additional queries. In some implementations, the query log is filtered, for example, to include only queries that are particularly likely to be received again in the future, e.g., that appear in the query log more than a threshold number of times during a particular time window. The query predictor 210 can identify potential queries from the query log, for example, by identifying all queries in the query log as potential queries, or by identifying all queries that satisfy a threshold number of submissions as potential queries. The query predictor 210 can also generate modifications of the received queries. Other data can also be used to predict queries, as is described in more detail below.

Query trend data is data that identifies how the number of query-submissions changes over time for queries. For example, query trend data can be received from a data source such as Google Trends™, available from Google Inc. of Mountain View, Calif. In some implementations, the query trend data is filtered, for example, using conventional techniques, to remove query submissions that appear to be spam. The query predictor 210 can identify potential queries from the query trend data by identifying queries for which the data indicates an increase in popularity that satisfies a threshold. For example, the query predictor 210 can select queries whose rate of increase in popularity satisfies a predetermined threshold, or can select queries whose rate of increase in popularity is the highest out of a group of considered queries. Alternatively, the query predictor 210 can select queries whose actual frequency of submission is higher than a predicted frequency of submission for the query. For example, the query predictor 210 can select queries whose difference between actual and predicted frequency satisfies a predetermined threshold, or can select queries having the highest difference between actual and predicted frequency. The predicted frequency of submission can be determined, for example, from an analysis of historical submissions of the query. As another example, rather than looking at rates of submission, the query predictor 210 can select queries that have a volume of submission that satisfies a threshold.

In some implementations, the query predictor 210 considers additional data to confirm that a query should be a potential query. For example, the query predictor 210 can determine whether recent news articles are responsive to the query. If so, this indicates that the query is describing a recent or ongoing event, and therefore, that the query should be a potential query.

The query predictor can also analyze news articles and other web documents received from a resource source 214. The resource source 214 can be, for example, a search system that crawls and indexes resources. While one resource source 214 is illustrated in FIG. 2, multiple resource sources that, for example, each correspond to different types of resources, can also be used. The query predictor 210 analyzes the resources to identify terms in the resources. These terms can be terms defined according to one or more regular expressions, terms that appear frequently, e.g., more than a threshold number of times, or terms that are associated with particular pre-determined topics of interest. In some implementations, the pre-determined topics of interest are potential queries identified using, for example, one or more of the techniques described above. The query predictor 210 can predict queries that contain single terms and phrases identified from the resources, or can predict additional queries by combining terms. For example, if at a point in time a news-worthy event occurs, such as an airline crash, a presidential election, or a final score of a football game, new incoming resources will generally include terms related to the event(s) in question. The query predictor 210 can then compare terms across a number of different resources and formulate new queries that contain terms common to multiple resources. For example, in the example mentioned above regarding an airline crash, the query predictor 210 can observe a frequent occurrence of the relevant flight number, a location of the crash, or other relevant information. The query predictor 210 can then formulate predictive queries based on this information.

Status updates are processed by the query predictor 210 much as news articles and other resources are processed, e.g., to identify frequently occurring terms. The query predictor 210 can then generate potential queries from the identified terms. In some implementations, the terms identified from status updates are combined with terms extracted from news articles and other web documents for the purposes of query generation.

Other techniques for identifying potential queries can also be used. For example, additional potential queries can be generated from an initial set of potential queries using conventional query rewriting and query expansion techniques.

The threshold manager 212 manages query-specific thresholds for search results corresponding to queries in the query corpus 206. In some implementations, each query in the query corpus 206 has an associated score threshold. As described in more detail below, search results are only associated with the query when they have a score that satisfies the threshold.

In general, search terms that occur very frequently (e.g., that frequently match resources from the resource source 214), such as a name of a very famous person, may require a high threshold in order to avoid an overwhelming number of results. Less frequently occurring search terms, such as a name of a person who is not as famous, may require a lower threshold to, for example, ensure a sufficient number of search results.

In order to determine an appropriate threshold for a given query, the threshold manager 212 can analyze scores for resources previously received from the resource source 214.

The appropriate threshold for a particular query can be, for example, a threshold that results in a manageable number, e.g., a number within a pre-determined range, of search results of an acceptable quality for the query. The threshold can be determined from an analysis of one or more of: a priori ratings of resources, historical score ratings of resources responsive to the query, and user-based feedback for resources responsive to the query. Alternatively, the threshold can be determined dynamically to, for example, result in a constant number of documents responsive to the query being identified over a particular time period. The thresholds can be updated according to a pre-determined schedule, or can be determined in a more dynamic fashion.

The query manager 202 may also manage the queries in the query corpus 206, e.g., may decide whether and when to remove or replace potential queries in the query corpus.

The resource manager 218 manages resources received from one or more resource sources 214. In some implementations, the resource manager 218 only receives resources from trusted resource sources, e.g., particular news organizations, blogs, forums, social networking sites, or other domains. In other implementations, the resource manager 218 receives resources from other resource sources, including untrusted resource sources. In these implementations, the resource manager can optionally filter out resources received from untrusted resource sources.

In some implementations, the resource manager 218 maintains a resource corpus. While only one resource source 214 is shown in FIG. 2, multiple resource sources can be used. Example resource sources 214 include search engines that crawl the Internet to extract information from web documents and provider feeds. Provider feeds can include, for example, news feeds, Really Simple Syndication (RSS) feeds, or feeds from content hosting websites such as Twitter.com. The resource sources 218 can use various mechanisms to determine when resources have been updated. For example, the system can receive updates according to the PubSubHubbub protocol available from Google Inc. of Mountain View, Calif. The PubSubHubbub protocol allows a web site to declare one or more hub servers. A server interested in the topic of the feed registers for updates with the appropriate hub(s) and subscribes to updates for the web site. Whenever the web site is updated, a publisher of the web site notifies the hub(s), which fetch the updated data and broadcast the data to registered subscribers. As another example, web sites can send updated site maps to the resource sources to indicate when pages on those web sites have been updated.

The resource manager 218 receives resources and identifies relevant information from the resources, including, for example, the time the resource was last updated. The resource is then provided to the predictive result manager 204 for indexing. In some implementations, the resource manager 218 further performs reference resolution to resolve references included in status updates. Reference resolution is described in more detail below, with reference to FIG. 5.

The predictive result manager 204 analyzes the resources received from the resource manager 218 and builds a predictive cache 216. In general, the predictive result manager 204 receives each resource as it is processed by the resource manager 218, indexes the resource, and determines whether the resource is responsive to one or more of the queries stored in the query corpus 206.

The predictive result manager 204 includes a search engine 220 and a statistics engine 222. The search engine 220 indexes resources received from the resource source 214 and identifies resources responsive to the potential queries stored in the query corpus. The search engine 220 also generates a score for each resource. The search engine can use different scoring functions for different types of resources, and can optionally maintain separate indexes for different types of resources.

The search engine 220 generates an overall score for a resource and a query, for example, using a result score for the resource that is a query-independent measure of the quality of the resource, a query-specific measure of how well the resource matches the query, or both. In general, the query-specific measure of how well the resource matches the query can be generated, for example, using conventional techniques.

The system can use various measures of the quality of the resource. Measures of quality of a resource can be derived from signals specific to the type of resource. In general, a signal is an objective measurement of a resource. Identified signals are combined to generate an overall quality score for the resource. For example, the system can use the freshness or recency of the resource in generating the overall quality score. Receiving signals and generating an overall quality score are described in more detail below, with reference to FIG. 7.

Once the search engine 220 determines a score for a resource, the search engine 220 determines whether the resource is responsive to the query, e.g., by comparing the score to the query-specific threshold determined by the threshold manager 212. If the score satisfies the threshold, the resource is responsive to the query, and is added to the predictive cache 216.

In some implementations, the search engine 220 further determines whether the contents of the resource are offensive or otherwise undesired, e.g., that the contents include profanity, pornography, hate speech, spam, stolen content, viruses, spyware, or fraudulent solicitations. If so, the system can either filter out these resources and not add search results for the resource for the cache, or can add the search results but flag them as being potentially offensive.

In some implementations, the search engine 220 or another component of the system 200 estimates a content age of the resource and filters out resources that have a content age that fails to satisfy a threshold. For example, resources having an estimated content age that is older than a set threshold can be filtered out. The search engine can generate an estimated content age from the time distribution of shingles in the resource. The search engine 220 extracts shingles, e.g., contiguous subsequences of tokens, from a resource. These shingle representations can be extracted, for example, using conventional shingle extracting techniques. Each shingle can then be associated with a particular time, e.g., the first time the shingle was ever observed in any resource by the system 200. The search engine 220 can then determine an estimated content age of the resource from the shingle distribution, for example, by estimating the content age as the age having a pre-determined percentage of the distribution associated with ages equal or older than the identified age, by determining a mean age from the distribution, or using other statistical techniques.

In general, the predictive cache identifies, for a given query, search results corresponding to resources that were identified as responsive to the query by the search engine 220. Each search result is associated with a time that the reference was last updated, and optionally the score determined for the search result. In some implementations, the system associates different sets of search results for a particular query with different characterizations of the query.

For example, different sets of search results can be identified depending on the language in which the search query was entered or the country from which the query was submitted.

The system 200 can maintain the predictive cache, for example, using conventional cache management techniques. In some implementations, the system 200 removes entries from the cache after a threshold amount of time. For example, search results can be removed when their corresponding resource was not updated within a threshold amount of time, e.g., ten minutes.

In some implementations, the system 200 also uses the query log to manage the predictive cache 216. For example, the query log 200 can be used to change a time-to-live (TTL) of an entry in the cache(s) 216, so that, for example, more useful entries may be maintained longer, while less useful ones are deleted relatively earlier from the cache(s). More generally, the query log 206 can be used to determine statistics about stored queries, which can be used to manage the cache(s) 216. For example, if a query is only received once every two hours, but cache entries are only maintained for a shorter period (e.g., one hour), the query entry may be removed from the predictive cache 216.

The statistics engine 222 maintains one or more statistics about the resources stored in the predictive cache 216. For example, the statistics engine 222 can generate and maintain statistics on how frequently new search results for particular queries are identified. For example, the statistics engine 222 can maintain data describing how many new search results are identified for particular queries over particular periods, e.g., ten minute increments. The statistics engine 222 can also maintain corpus-specific statistics. For example, the statistics engine 222 can maintain specific statistics for different types of resources, e.g., one set of statistics for status updates, another set of statistics for news articles, and a third set of statistics for web documents. These statistics can be used to determine whether to include real-time search results in a user interface document responsive to a query, for example, as described below with reference to FIG. 3, and can also be provided to client software.

Figure 3:
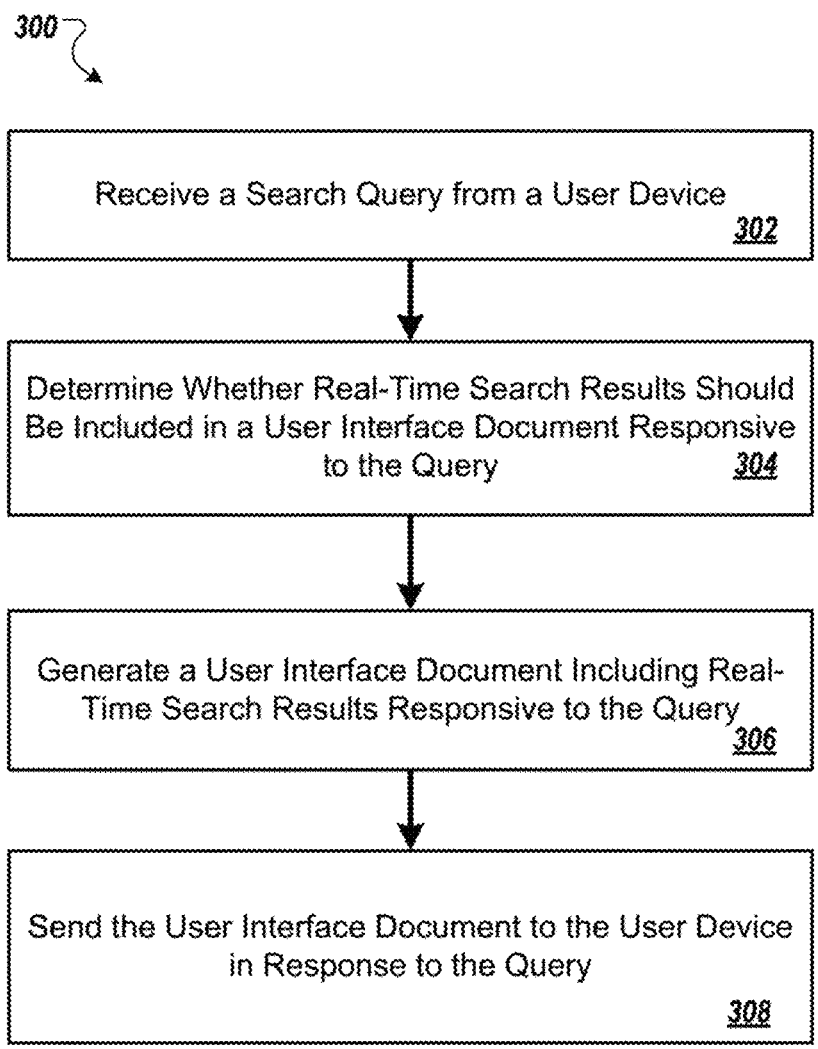
FIG. 3 is a flow chart illustrating an example method for generating a user interface document in response to a search query.

FIG. 3 is a flow chart illustrating an example method for generating a user interface document in response to a search query. For convenience, the method will be described in reference to a system that performs the method. The system can be, for example, the search engine 130 described above with reference to FIG. 1.

The system receives a search query from a client (302), for example, as described above with reference to FIG. 1.

The system determines whether real-time search results should be included in a user interface document responsive to the query (304). In some implementations, when the client receives the search query through an interface dedicated to real-time search results, or when the user in some other way explicitly requests real-time search results, the system automatically determines that real-time search results should be included.

In some implementations, the system analyzes one or more of several signals to determine whether real-time search results should be included. In general, the system generates one or more scores from the signals and compares each score to a threshold for the score. If each score satisfies its corresponding threshold, the system determines that real-time search results should be included in the user interface document. In some implementations, when the system does not automatically determine that real-time search results should be presented when the user requests search results, the thresholds are more aggressive, e.g., harder to satisfy. For example, the thresholds can be harder to satisfy when the search engine receives the query through a user interface for multiple types of search results than when the search engine receives the query through an interface dedicated to real-time search results.

One signal that can be used is the rate with which the predictive result manager 204 identifies new documents responsive to the query. Data on how many new documents the predictive result manager 204 identifies over time can be received from the predictive result manager 204, for example, as described above with reference to FIG. 2. The system can then analyze the data, for example, to determine whether there has been a recent, sudden increase in the number of new documents responsive to the query. If so, the system will be more likely to determine that real-time search results should be included in the user interface document.

Another signal can be derived from the content of particular types of resources, for example, status updates, that have been identified as responsive to the query by the predictive result manager. For example, the system can receive counts of common words shared among resources responsive to the query. If a large number of resources share a common term, or if a large number of common terms are shared among resources, the system can conclude that it is likely that the resources include information on a common event that is of interest to the user, and therefore be more likely to determine that real-time search results should be included in the user interface document.

Yet another signal is the obvious intent of the user. For example, if the query includes terms from a pre-defined list of terms that indicate a desire for real-time search results, the system will be more likely to determine that the real-time search results should be included. Example terms that indicate a desire for real-time search results include terms like "twitter" that indicate a desire for information from a particular status update service, terms like "#" that are used most commonly in status updates, terms of the form "@" followed by the name of a famous person, which indicate a desire for status updates discussing the famous person, and terms such as "latest" or "breaking," that indicate a desire for the latest news on a particular story.

Another signal is the freshness of the query. For example, the system can receive trend data identifying queries that are having an increase in popularity. The system can be more likely to determine that real-time search results should be included in the user interface document when the query is experiencing a sudden increase in popularity, because this sudden increase in popularity may indicate that something relevant to the query is happening right now, and thus there will continue to be new real-time search results.

Yet another example signal is whether the query is a common term. If so, the system is less likely to determine that real-time search results should be included in the user interface document. Another example signal is whether the query contains many terms. If so, the system is more likely to determine that real-time search results should be included in the user interface.

In some implementations, the system further considers the number of real-time search results cached by the predictive result manager 204 as responsive to the query, e.g., that have an age that is less than a threshold. If fewer than a threshold number of results (once duplicates are removed) are cached, the system may determine to not include real-time search results.

The system generates a user interface document including real-time search results responsive to the query (306). The system sends the user interface document to the client in response to the query (308).

In some implementations, when the client receives the search query from an interface dedicated to real-time search results, for example, the user interface illustrated in FIG. 3, but the system determines that real-time search results should not be presented, the system generates other search results, for example, using conventional techniques. In some implementations, the search results are identified using an index that includes a subset of the total number of documents indexed by the search engine, and that is frequently updated.

Figure 4:
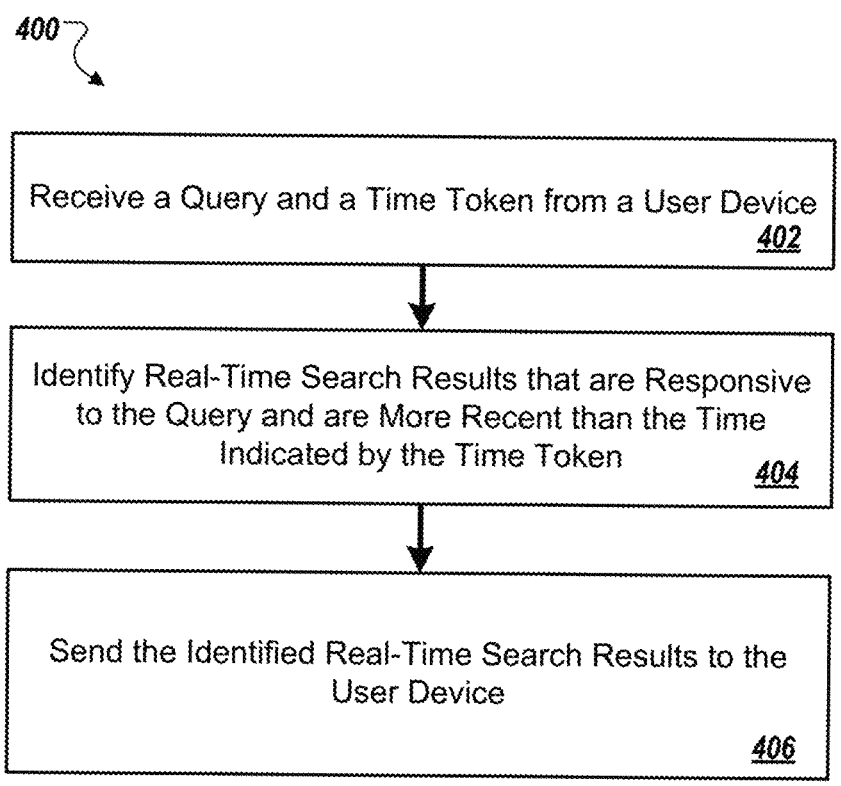
FIG. 4 is a flow chart illustrating an example method for identifying real-time search results in response to a re-submitted query from a client.

FIG. 4 is a flow chart illustrating an example method for identifying real-time search results in response to a query from a client. For convenience, the method will be described in reference to a system that performs the method. The system can be, for example, the real-time engine 160 described above with reference to FIG. 1.

The system receives a query and a time token from a client (402). The query corresponds to a query for which the client is displaying real-time search results. The time token is data that identifies the time that the most recent real-time search result presented by the client was updated. The time token was received by the client along with the last real-time search results the client received from the system. If the client has not yet presented real-time search results responsive to the query, the time token indicates a time earlier than the update time for all of the cached search results, e.g., zero, or is omitted.

In some implementations, the time token indicates an actual time. In other implementations, the time token stores data that can be used to determine a temporal position in the search results responsive to the query.

The system identifies real-time search results that are responsive to the query and are more recent than the time indicated by the received time token (404). For example, the cache 216 maintained by the predictive result manager 204 can associate a time with each entry. The time is the time that the resource corresponding to the entry was last updated. The system can then identify search results stored for the query in the cache that have an associated time that is later than the time indicated by the received time token.

In some implementations, the system filters the real-time search results, for example, according to the scores associated with the real-time search results in the cache 216. For example, if the cache 216 contains more than a threshold number of search results responsive to the query, the system can select the best search results according to the scores, so that only the threshold number of search results is returned. The system may also filter the search results, for example, so that only search results that will display well on a mobile device are returned when the client is a mobile device. The system may also filter out search results that have been marked as undesirable, e.g., because they are pornographic, spam, malware, or otherwise offensive.

In some implementations, the system also filters out duplicate search results. For example, the predictive result manager 204 can maintain, for different search results at different points in time, data identifying other search results that duplicate that search result. Conventional duplication detection techniques can be used to identify the duplicate search results. The system can then consider the search results in order of most recent to least recent and filter out, for each considered search result, any duplicate search results.

The system sends the identified real-time search results to the client (406). The system also sends a time token corresponding to the time the most recent identified real-time search result was updated.

Figure 5:
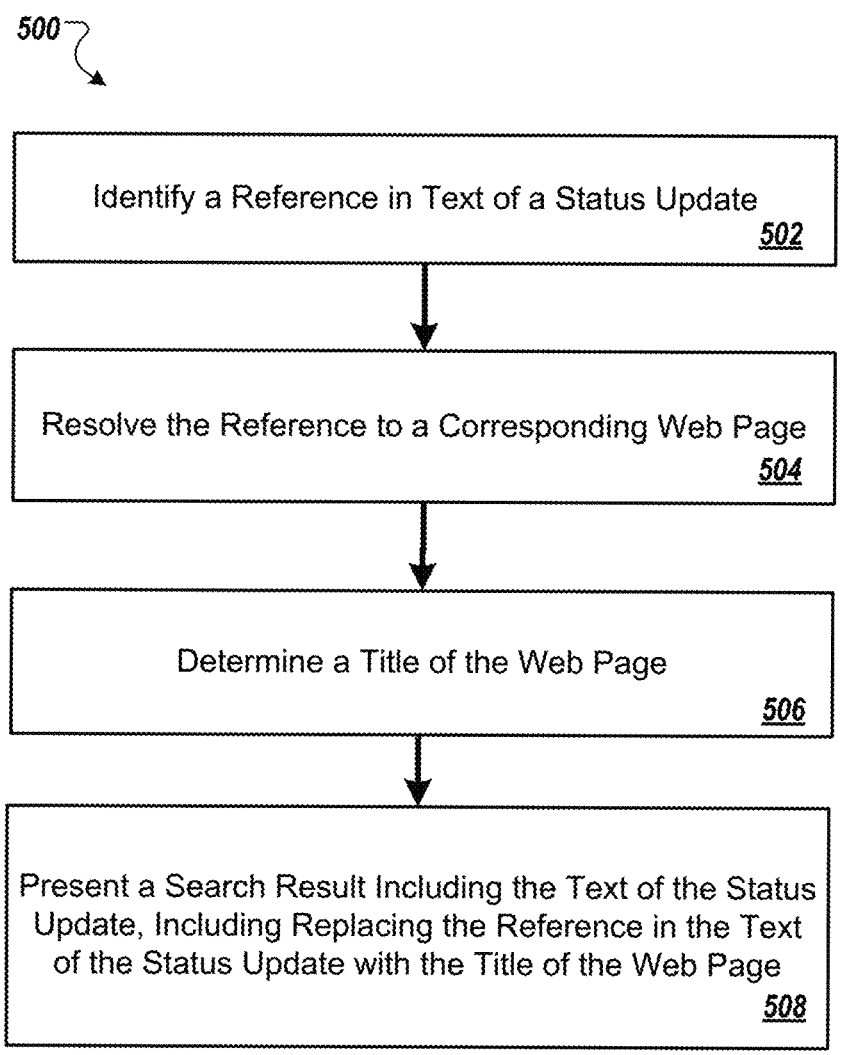
FIG. 5 is a flow chart illustrating an example method for resolving a reference in a status update.

FIG. 5 is a flow chart illustrating an example method for resolving a reference in a status update. For convenience, the method will be described in reference to a system that performs the method. The system can be, for example, the server 104 described above with reference to FIG. 1.

The system identifies a reference in text of a status update (502). The reference can be, for example, a URL. The system can identify the reference, for example, using regular expression matching. The system resolves the reference to a corresponding web page (504), for example, as described below with reference to FIG. 6. The system determines a title of the web page (506), for example, using conventional techniques. The system can also determine additional information about the web page, including, for example, the domain of the web page. The system presents a search result including the text of the status update (508), including replacing the reference in the text of the status update with the title of the web page. The system can present the search result, for example, by sending the search result to a client for presentation to the user. An example search result is described below with reference to FIG. 6.

While the above describes modifying the text of a status update that is presented as a search result, reference resolution can also be used in other ways. For example, the system can filter results that link to web pages that have poor quality or have been identified as spam sites, malware sites, or other undesirable sites. The system can also detect when multiple status updates link to the same webpage and only present one status update that links to a given page. The system can also identify the web pages that are most frequently linked to. The system can determine whether the content of the web page matches the content of the status update, for example, using conventional techniques. If the content of the web page does not match the content of the status update, the system can flag the status update as being possible spam. The system can use the reference resolution to determine the language of the destination page; for example, if a status update in English links to a particular page, the system can determine that the page is also in English. As another example, the system can use the resolved URL as a search query and identify other search results related to the resolved URL.

As yet another example, the system can index the web page linked to by the reference or the content on the web page, e.g., an image, if this content has not otherwise been indexed.

FIG. 6 illustrates an example search result where a uniform resource locator (URL) has been resolved. The search result corresponds to a status update where the user said, "Who are they going to get to report it? http://exampleurl1." The status report includes a reference, e.g., the URL "http://exampleurl1" to a webpage. This reference can be a direct link to a webpage or a redirecting link. A redirecting link is a link that redirects to a different webpage.

The search result includes information derived from a resolution of the reference. References that need to be resolved can be identified, for example, using conventional pattern matching techniques. For example, the system can look for patterns that indicate a URL such as a pattern including the string "http://" or popular domain names such as "bit.ly." To resolve a reference, the final page linked to by the reference is identified. This can include following multiple redirecting links until a final page is found. The final page is a page that contains actual text and web content, and is not merely a link to a different page. Then, information is extracted from the final page. This information can include, for example, a title of the page or a date the page was updated. Quality information about the page can also be determined. Quality information can include information on how frequently other pages link to the page or information about the publisher or host of the content on the page.

The search result includes the title of the page and the domain that hosts the actual page (as opposed to the domain that hosts a re-directing URL that links to the page) in place of the reference that was in the original status update. Alternatively, the search result can include just the title of the page or just the domain of the page. The title of the page can be presented as a selectable user interface element such as a hyperlink. When a user clicks on the hyperlink, the user interface can display the page linked to by the URL. The target of the hyperlink can be the resolved page or the URL specified in the status update.

Figure 7:
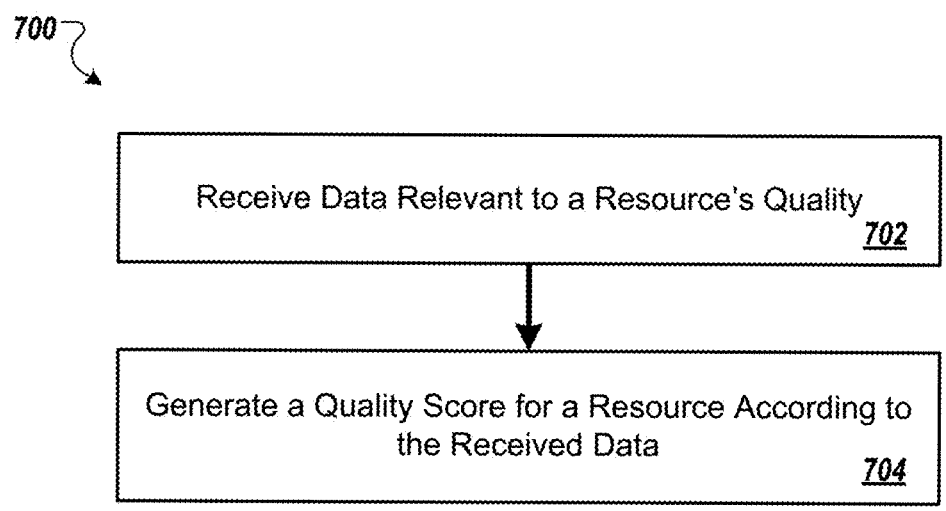
FIG. 7 is a flow chart illustrating an example method for determining a score measuring the quality of a resource.

FIG. 7 is a flow chart illustrating an example method for determining a score measuring the quality of a resource. For convenience, the method will be described in reference to a system that performs the method. The system can be, for example, the search engine 220 described above with reference to FIG. 2.

The system receives data relevant to a resource's quality (702). The data can include one or more signals. Different signals can be used depending on the type of resource. These can include conventional signals for quality, including, for example, signals computed from links between web documents and signals that indicate whether a document is potentially spam. For example, the system can receive signals computed according to conventional techniques for web documents.

The system can also receive conventional signals for news articles. In addition, the search engine 220 can receive additional measures of quality of the news articles.

For example, the system can receive a signal indicating the importance of the source of the news article. For example, common news sources can be ranked according to their importance. For example, sources such as CNN, the New York Times, and the Los Angeles Times can be included in a top tier source category, sources such as the XYZ News and All News Times can be included in a second tier source category, and sources such as local news organizations can be included in a third tier source category. The importance of the sources may change depending on the subject matter of the news article or the query, since certain news organizations may be better sources for articles or queries regarding certain subjects. For example, if a query or news article is about a local news story, news sources that are geographically close to the location where the local news story occurred can be in the top tier source category, even though they would typically be included within a third tier source category for national stories. The ranking of sources can also be updated over time.

As another example, the system can receive a signal indicating the quality of the source of the article. Example quality indicators are awards received by the source or third-party ratings of the source. Other quality indicators include one or more of the number of articles published during the news source during a particular time period, an average length of the articles published by the news source during a particular time period, an amount of coverage of important topics that the news source provides, the breadth of coverage of the news source, the number of original named entities in articles published by the news source, an amount of network traffic to the news source's web site, the number of countries from which the network traffic to the news source's web site originates, circulation statistics for the news source, a size of the staff of the news source, and the number of bureaus of the news source.

The system can also receive additional signals, for example, signals describing the quality of the authors or publishers of particular articles as determined from their other publisher articles, as described, for example, in U.S. Pat. No. 7,565,358.

The system can also receive signals indicating the expertise of the source with respect to the query. For example, the system can analyze a vector of terms that frequently appear in articles published by the source and determine how well the terms of the search query match the terms in the vector of terms.

The system can also receive signals indicating the originality of the news article. For example, often one source publishes an article, and then several sources copy the text of all or part of the article verbatim. The system can assign a higher score to the first article that was published, assign a higher score to the first publisher to publish, or both. The first article that was published can be determined, for example, according to time stamps associated with the articles.

As yet another example, the system can receive signals indicating the position of the news article relative to other news articles on a web page that links to the news articles.

The system can also receive conventional signals for blogs. The system can also receive additional measures of quality of the blogs.

For example, the system can receive signals indicating the popularity of the blog hosting a particular blog post, for example, how frequently the blog is selected as a search result for any queries, or for the specific query for which the blog is being scored.

The system can also receive other signals. For example, the system can receive signals indicating whether any blogrolls link to the blog, and if so, whether the blogroll also contains links to well-known or trusted blogs. A blogroll is a list in a blog of links to other documents and blogs. As yet another example, the system can receive a signal indicating whether other sources, e.g., e-mails or chat documents, link to the blog. If so, that is an indication that the blog is of high quality. As another example, the system can consider the overall length of the blog. Short blog length can be an indicator of poor blog quality.

As another example, the system can receive signals indicating whether users have added tags indicating a categorization of the blog. If so, the tag indicates that a user has determined that a particular category appropriately describes the blog. This can be a positive indication of the quality of the blog.

As yet another example, the system can receive signals indicating third party ratings of the blog. These ratings can be based, for example, on the quality of the website, the originality of the content of the blog, the information available on the blog, the layout of the blog, the correctness of grammar or spelling used, whether obscene or inappropriate material is presented, and whether blank or incomplete pages are present. The ranking can be for individual pages of the blog, or for the blog as a whole.

As another example, the system can receive signals indicating the size of the blog's subscription; e.g., how many users subscribe to blogs they read through blog reading services. High blog subscription can be a signal of blog quality.

The system can also receive other signals, for example, signals indicating the frequency of new posts on the blog document, the content of posts in the blog document, the size of the posts in the blog document, the link distribution in the blog document, and the presence of ads in the blog document. Spammers typically post either at regular intervals or at spurts; therefore, if either behavior is observed in the frequency with which new posts are posted on the document, the blog can be assigned a lower score. The content of the blog post can be a negative indication when the content in the blog feed does not match the content in the actual blog document, when content is duplicated in multiple posts, or when commercial terms or terms that are frequently associated with spam appear in the document. The size of the posts in the blog document can be a negative indication when the size is constant across time. The link distribution in the blog document can be a negative indication, for example, when the number of links to any single external site exceeds a threshold. Similarly, if the blog contains a large number of ads, or ads in the more recent posts, that can also be a negative indication.

The system can receive various signals for a status update. These signals can include data indicating the quality of the user who submitted the status update and the quality of the status update itself. This data can include conventional signals and additional signals.

For example, the system can consider signals that indicate whether the user who posted the status update is likely to be a spammer. Various signals can be used to make this determination. For example, the search engine 220 can consider how often the user posts status updates, the pattern with which the user posts status updates over time, or the content of status updates posted by the user over time. If the user posts status updates with a frequency that exceeds a threshold, the system can determine that the user is more likely a spammer. If the user has a pattern of posting status updates in spurts, e.g., not posting for a while, then posting with a high frequency, and then not posting for a while, the user can be identified as a likely spammer. If the user frequently uses commercial terms or other terms associated with spam, e.g., the term "Viagra," the system can consider the user a likely spammer. A user frequently uses particular terms, for example, when the user uses the terms more than a pre-determined number of times in a given period of time, or when more than a pre-determined percentage of terms used by the user are the particular terms.

When a status update contains a particular reference, e.g., a URL linking to a particular web page, the system can receive a signal that indicates the number of other status updates that also include the same reference. If this number satisfies a threshold, the search engine 220 can determine that the contents of the status update are likely of interest, and therefore assign a higher score to the status update.

The system can also receive a signal that measures the quality of a web page linked to by a reference in the status update. The higher the quality score for the web page linked to by the reference, the higher the likely quality of the status update.

As yet another example, the system can receive a signal that measures the overall quality of the status update. For example, the system can have a pre-defined set of rules that determine what makes a status update a high-quality status update. For example, high-quality status updates could be status updates that do not contain strange characters, that are written using good grammar, and/or status updates that do not include empty hash tags, e.g., hash tags that are not followed by any additional text. The received signal can be a measure of how well a given status update satisfies the pre-determined rules.

The system generates a quality score for the resource according to the received data (704). For example, the system can combine one or more of the received signals to generate the quality score.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by a client device, real-time search results for a first search query and a time token;
   presenting, by the client device, the real-time search results for the first search query in a user interface;
   re-submitting, by the client device, the first search query with the time token;
   receiving, by the client device and from a server, additional real-time search results that are more recent than a most-recent time identified by the time token; and
   presenting, by the client device, the additional real-time search results in the user interface.

2. The method of claim 1, wherein the time token is data that identifies a most-recent time that any resource identified by any of the received real-time search results was uploaded or updated.

3. The method of claim 1, wherein an additional real-time search result is more recent than the most-recent time identified by the time token when a resource identified by the additional real-time search result was last updated more recently than the most-recent time identified by the time token.

4. The method of claim 1, wherein the user interface is an interface that is dedicated to real-time search results.

5. The method of claim 1, wherein the real-time search results include search results that identify resources that were last updated or uploaded within a predetermined time threshold of a received time token.

6. The method of claim 1, wherein the user interface document further includes non-real-time search results.

7. The method of claim 6, wherein the non-real-time search results include search results that were not recently updated and not recently uploaded within a predetermined time threshold of a received time token.

8. A system comprising one or more computers and one or more storage devices storing instructions that when executed by the one or more computers cause the one or more computers to perform operations comprising:
receiving, by a client device, real-time search results for a first search query and a time token;
presenting, by the client device, the real-time search results for the first search query in a user interface;
re-submitting, by the client device, the first search query with the time token;
receiving, by the client device and from a server, additional real-time search results that are more recent than a most-recent time identified by the time token; and
presenting, by the client device, the additional real-time search results in the user interface.

9. The system of claim 8, wherein the time token is data that identifies a most-recent time that any resource identified by any of the received real-time search results was uploaded or updated.

10. The system of claim 8, wherein an additional real-time search result is more recent than the most-recent time identified by the time token when a resource identified by the additional real-time search result was last updated more recently than the most-recent time identified by the time token.

11. The system of claim 8, wherein the user interface is an interface that is dedicated to real-time search results.

12. The system of claim 8, wherein the real-time search results include search results that identify resources that were last updated or uploaded within a predetermined time threshold of a received time token.

13. The system of claim 8, wherein the user interface document further includes non-real-time search results.

14. The system of claim 13, wherein the non-real-time search results include search results that were not recently updated and not recently uploaded within a predetermined time threshold of a received time token.

15. A computer program product encoded on one or more non-transitory computer readable media, the computer program product comprising instructions that when executed by one or more computers cause the one or more computers to perform operations comprising:
receiving, by a client device, real-time search results for a first search query and a time token;
presenting, by the client device, the real-time search results for the first search query in a user interface;
re-submitting, by the client device, the first search query with the time token;
receiving, by the client device and from a server, additional real-time search results that are more recent than a most-recent time identified by the time token; and
presenting, by the client device, the additional real-time search results in the user interface.

16. The computer program product of claim 15, wherein the time token is data that identifies a most-recent time that any resource identified by any of the received real-time search results was uploaded or updated.

17. The computer program product of claim 15, wherein an additional real-time search result is more recent than the most-recent time identified by the time token when a resource identified by the additional real-time search result was last updated more recently than the most-recent time identified by the time token.

18. The computer program product of claim 15, wherein the user interface is an interface that is dedicated to real-time search results.

19. The computer program product of claim 15, wherein the real-time search results include search results that identify resources that were last updated or uploaded within a predetermined time threshold of a received time token.

20. The computer program product of claim 15, wherein the user interface document further includes non-real-time search results.

* * * * *